(12) United States Patent
Enomoto et al.

(10) Patent No.: US 7,198,470 B2
(45) Date of Patent: Apr. 3, 2007

(54) FRANCIS TURBINE

(75) Inventors: Yasuyuki Enomoto, Chiba-ken (JP);
Kaneo Sugishita, Kanagawa-ken (JP);
Sadao Kurosawa, Kanagawa-ken (JP);
Toshiaki Suzuki, Kanagawa-ken (JP);
Takanori Nakamura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 119 days.

(21) Appl. No.: 10/867,207

(22) Filed: Jun. 15, 2004

(65) Prior Publication Data
US 2005/0042104 A1    Feb. 24, 2005

(30) Foreign Application Priority Data
Jun. 16, 2003 (JP) ............................. 2003-171108
Aug. 11, 2003 (JP) ............................. 2003-291266

(51) Int. Cl.
*F03B 3/02*    (2006.01)
(52) U.S. Cl. .................. 416/185; 416/243; 416/DIG. 2
(58) Field of Classification Search ................. 416/185, 416/188, 243, DIG. 2
See application file for complete search history.

(56) References Cited

U.S. PATENT DOCUMENTS 147,351 A * 2/1874 Tyler ...................... 416/186 R
1,942,995 A   1/1934 Biggs
2,484,554 A * 10/1949 Concordia et al. .......... 416/188

(Continued)

FOREIGN PATENT DOCUMENTS

| JP | 59-18553 B2 | 4/1984 |
| JP | 8-312517 A | 11/1996 |
| JP | 2000-136766 A | 5/2000 |

OTHER PUBLICATIONS

U.S. Appl. No. 10/867,203, filed Jun. 15, 2004, Enomoto et al.
U.s. Appl. No. 10/914,639, filed Aug. 10, 2004, Enomoto et al.
Office Action in U.S. Appl. No. 10/867,203, dated Mar. 6, 2006.
Y. Enomoto, U.S. PTO Office Action, Ser. No. 10/914,639, Mar. 24, 2006, 9 pages.
Office Action in U.S. Appl. No. 10/914,639 dated Aug. 7, 2006.

*Primary Examiner*—Ninh H. Nguyen
(74) *Attorney, Agent, or Firm*—Foley & Lardner LLP (57) ABSTRACT

A Francis turbine with an improved shape of blades, which can reduce cavitations generated on the surface of the blades or reduce the secondary flow around the blades, is provided. A Francis turbine comprises a rotating shaft, a crown, a plurality of blades, and a band. The crown can rotate with the rotating shaft. The blades are circumferentially arranged on the crown, each of which including an inner end as a trailing edge. The band is coaxially coupled with the crown by the blades. The rotating shaft, the crown, the blades, and the band as a whole rotate toward a turbine direction during a turbine operation. A projected profile of the trailing edge on a perpendicular plane, which is perpendicular to a center axis of the rotating shaft, is curved toward a direction opposite to the turbine direction at least in the crown side.

17 Claims, 9 Drawing Sheets

U.S. PATENT DOCUMENTS

| | | |
|---|---|---|
| 3,639,080 A | 2/1972 | Yamabe |
| 3,874,819 A | 4/1975 | Tamura et al. |
| 3,918,627 A * | 11/1975 | Kawano et al. ............. 228/178 |
| 4,479,757 A | 10/1984 | Holmes et al. |
| 6,135,716 A | 10/2000 | Billdal et al. |
| 6,254,338 B1 * | 7/2001 | Keller ........................ 415/160 |

* cited by examiner

FRANCIS TURBINE

CROSS REFERENCE TO RELATED APPLICATION

This application is based upon and claims the benefit of priority from prior Japanese Patent Applications No. 2003-171108 filed on Jun. 16, 2003, and No. 2003-291266 filed on Aug. 11, 2003, the entire contents of which are incorporated herein by reference.

FIELD OF THE INVENTION

This invention relates to a Francis turbine that is used for a hydraulic turbine or a pump, and in particular, a Francis turbine having blades with an improved shape on a trailing edge.

BACKGROUND

A Francis turbine is used in a hydraulic machine, including a reversible pump-turbine, for power generation.

A conventional Francis turbine runner is described in U.S. Pat. No. 4,479,757. This conventional Francis turbine runner includes blades whose inlet (a leading edge) shape is curved toward a direction opposite to a rotating direction of a turbine operation from a band side to a crown side.

Another conventional Francis turbine runner is described in U.S. Pat. No. 6,135,716. This conventional Francis turbine runner includes blades whose inlet (a leading edge) shape is curved toward a rotating direction of a turbine operation from a band side to a crown side. This conventional Francis turbine runner also includes blades whose outlet (a trailing edge) shape is curved toward a rotating direction of a turbine direction from a crown side to a band side.

Also, a conventional reversible pump-turbine is described in Japanese Patent Publication (Kokai) No. 8-312517. A runner of this conventional reversible pump-turbine has blades whose trailing edge is curved toward a direction opposite to a rotation direction of turbine operation from a middle point of the trailing edge to a band side.

Another conventional reversible turbine is described in Japanese Patent Publication (Kokai) No. 2000-136766. A runner of this conventional reversible pump-turbine has blades whose trailing edge is curved so that the trailing edge is formed to be convex in a rotation direction of a turbine operation.

Those shapes of the blades of conventional Francis turbines are developed to improve a hydraulic efficiency or to reduce cavitations. Still there is room to develop the shape of the blades that improves the efficiency because of the recent development of technology in a field such as computational fluid dynamics.

Especially, it is known that secondary flow, which is a flow not being along a flow line, distorts a pressure distribution on the blades and results in loss of hydraulic efficiency.

SUMMARY OF THE INVENTION

Accordingly, an advantage of an aspect of the present invention is to provide a Francis turbine with an improved shape of blades which can reduce cavitations generated on the surface of the blades or reduce the secondary flow around the blades.

To achieve the above advantage, one aspect of the present invention is to provide a Francis turbine that comprises a rotating shaft, a crown, which can rotate with the rotating shaft, a plurality of blades circumferentially arranged on the crown, each of which including an inner end as a trailing edge, and a band coaxially coupled with the crown by the blades, wherein the rotating shaft, the crown, the blades, and the band as a whole are driven by water and rotate toward a turbine direction during a turbine operation, wherein a projected profile of the trailing edge on a perpendicular plane, which is perpendicular to a center axis of the rotating shaft, is curved toward a direction opposite to the turbine direction at least in the crown side.

Further, another aspect of the present invention is to provide a Francis turbine runner, which is rotatable around a rotation axis, that comprises a crown, which can rotate around the rotation axis, a plurality of blades circumferentially arranged on the crown, each of which including an inner end as a trailing edge, and a band coaxially coupled with the crown by the blades, wherein the crown, the blades, and the band as a whole are driven by water and rotate toward a turbine direction during a turbine operation, wherein a polar coordinate system defined by parameters r and θ can be introduced on a perpendicular plane, which is perpendicular to the rotation axis, such that, (a) an origin is set at the rotation axis, (b) a positive direction of θ is set to the turbine direction, wherein a projected profile of the trailing edge on the perpendicular plane is expressed in the polar coordinate system as, (c)

$$\frac{\partial^2 \theta}{\partial r^2} > 0$$

at least in the crown side.

Further features, aspects and advantages of the present invention will become apparent from the detailed description of preferred embodiments that follows, when considered together with the accompanying figures.

DETAILED DESCRIPTION OF THE PREFERRED EMBODIMENTS

A first embodiment in accordance with the present invention will be explained with reference to FIGS. 1 to 4.

Figure 1:
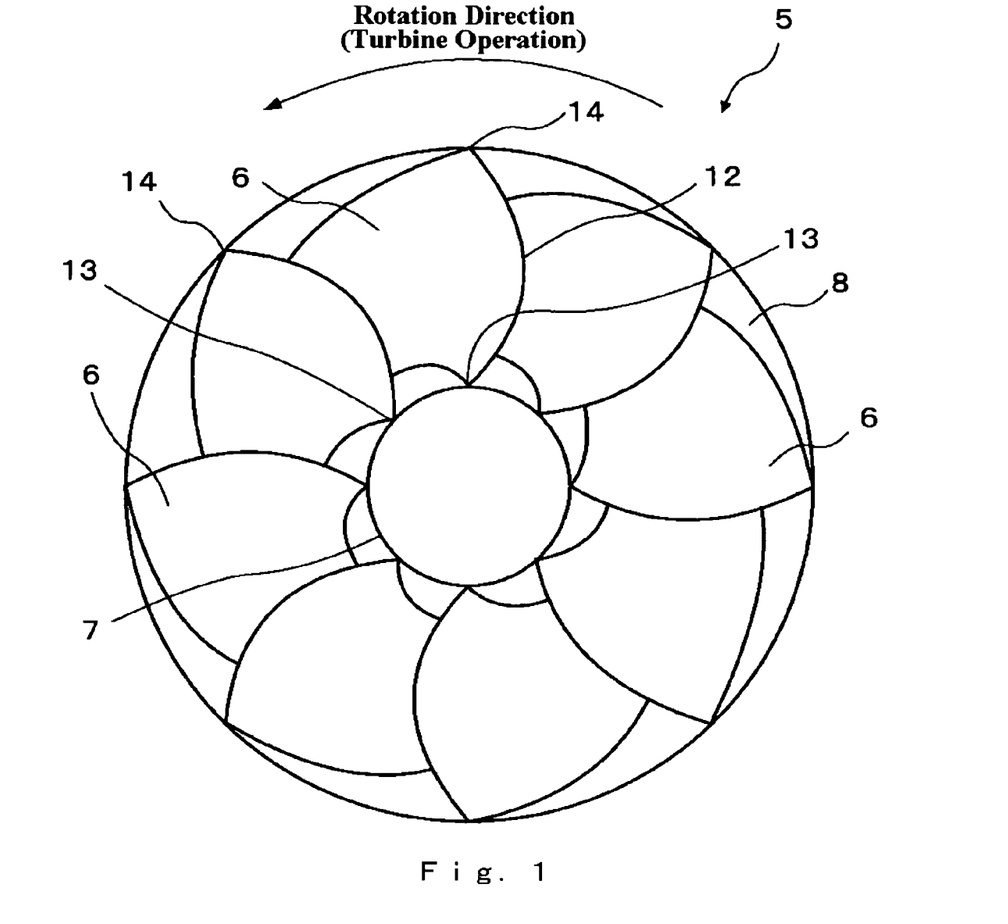
FIG. 1 is a plan view of a Francis turbine runner seen from a runner outlet side, according to a first embodiment of the invention.

FIG. 1 is a plan view of a Francis turbine runner 5 seen from a runner outlet side, according to a first embodiment of the invention. In other words, FIG. 1 shows projected profiles of the outlet of the Francis turbine runner on a plane that is perpendicular to a rotation axis of the Francis turbine runner. A plurality of runner blades (runner vanes) 6 are disposed in a circumferential array on a crown 7. A head side of the runner blade 6 is supported by the crown 7 at a crown edge 13 (also referred to as a crown connecting point). A bottom side of the runner blade 6 is supported by a band 8 at a band edge 14 (also referred to as a band connecting point). FIG. 1 shows the Francis turbine runner 5 having eight runner blades 6 disposed therein. Thus, band 8 is coaxially coupled to crown 7 by blades 6 and a rotation shaft (not shown) is connected at the center of crown 7. Francis turbine runner 5 is driven and rotates around a rotation axis, which is corresponding to the center of crown 7 where rotating shaft 28 is connected, toward a turbine direction during the turbine operation. Hereinafter a rotation direction during the turbine operation is referred to as the turbine direction.

An inner end of blade 6 is referred to as a trailing edge 12, since water flows out from the inner ends of blades 6 during the turbine operation. When trailing edge 12 of blade 6 is projected on a plane perpendicular to the rotation axis, trailing edge 12 is formed to be concave on the projected plane with respect to the turbine direction. In FIG. 1, the turbine direction is shown as counterclockwise, trailing edge 12 of the runner blade 6 is formed to be concave left. In other words, a projected profile of the trailing edge 12 on the plane is curved toward a direction opposite to the turbine direction, and formed to be convex with respect to the direction opposite to the turbine direction. Therefore, since a blade length near a radial center of blade 6 is elongated compared with a conventional one, a pressure difference generated on a blade surface per unit length becomes small. Thus, pressure on a suction surface of blade 6 becomes relatively large, and consequently generation of the cavitation can be inhibited.

Figure 2:
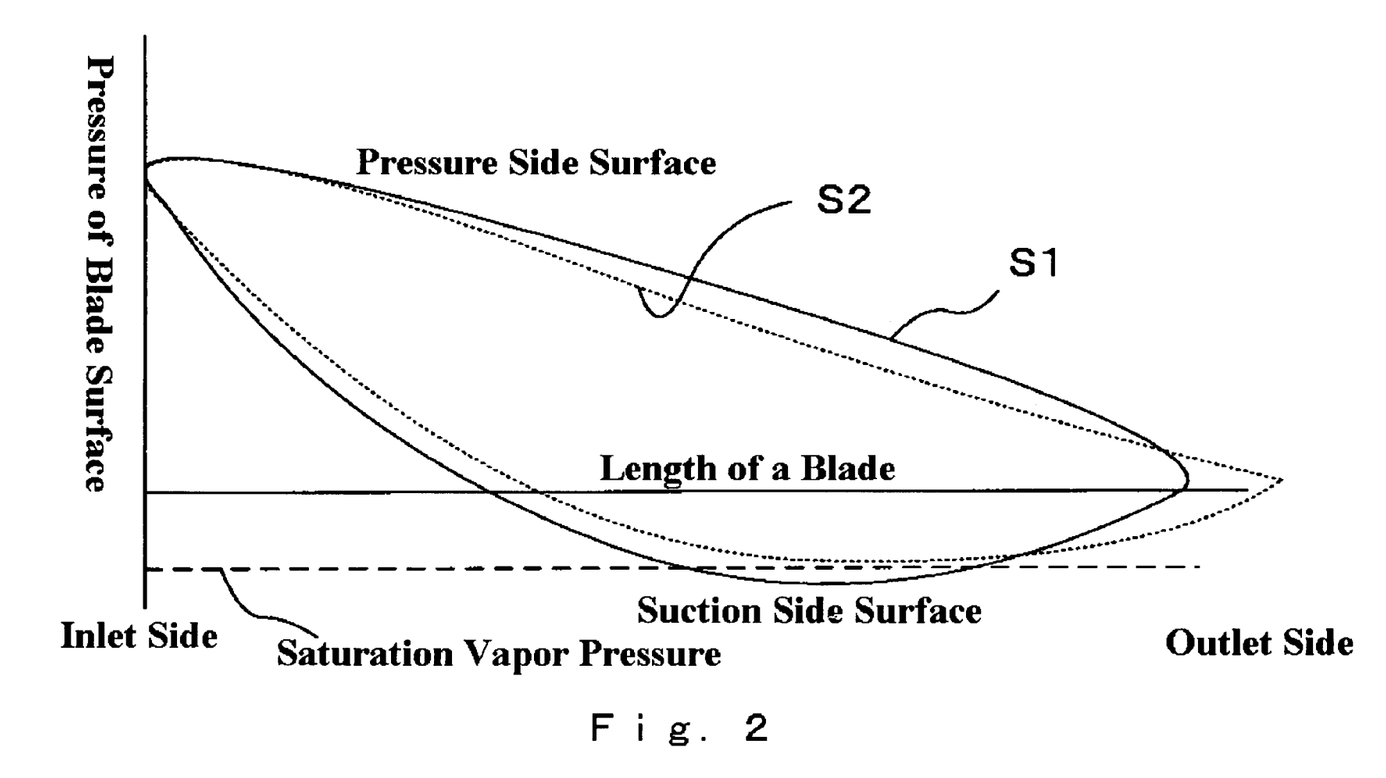
FIG. 2 is a pressure distribution diagram around a surface of a blade near a center of a stream line in the turbine operation according to the first embodiment of the invention.

FIG. 2 is a pressure distribution diagram around a surface of runner blade 6 near a center of a stream line in the turbine operation according to the first embodiment of the invention. A solid line is a conventional pressure distribution curve S1; and a dotted line is a pressure distribution curve S2 according to the first embodiment of the invention. The horizontal axis indicates a position along the blade from a leading edge to a trailing edge. As shown in FIG. 2, the difference of blade pressure between a pressure surface and the suction surface of blade 6 is reduced compared with the conventional pressure distribution curve S1. Pressure at the suction side surface of the blade is relatively high, and the minimum value of the pressure on the blade surface is not less than a saturation vapor pressure at which the cavitation is generated. This shows that the cavitation is hardly generated in Francis turbine runner 5 according to the embodiment, even at a high-flow operation point at which flow velocity in the Francis turbine runner 5 increases and the pressure on the runner-blade surface is relatively reduced.

As described above, according to the first embodiment of the invention; the cavitation is hardly generated compared with the conventional one, even in the turbine operation with a larger flow rate. Therefore hydraulic efficiency may be improved. Or it may be operated in a wide operation range.

Figure 3:
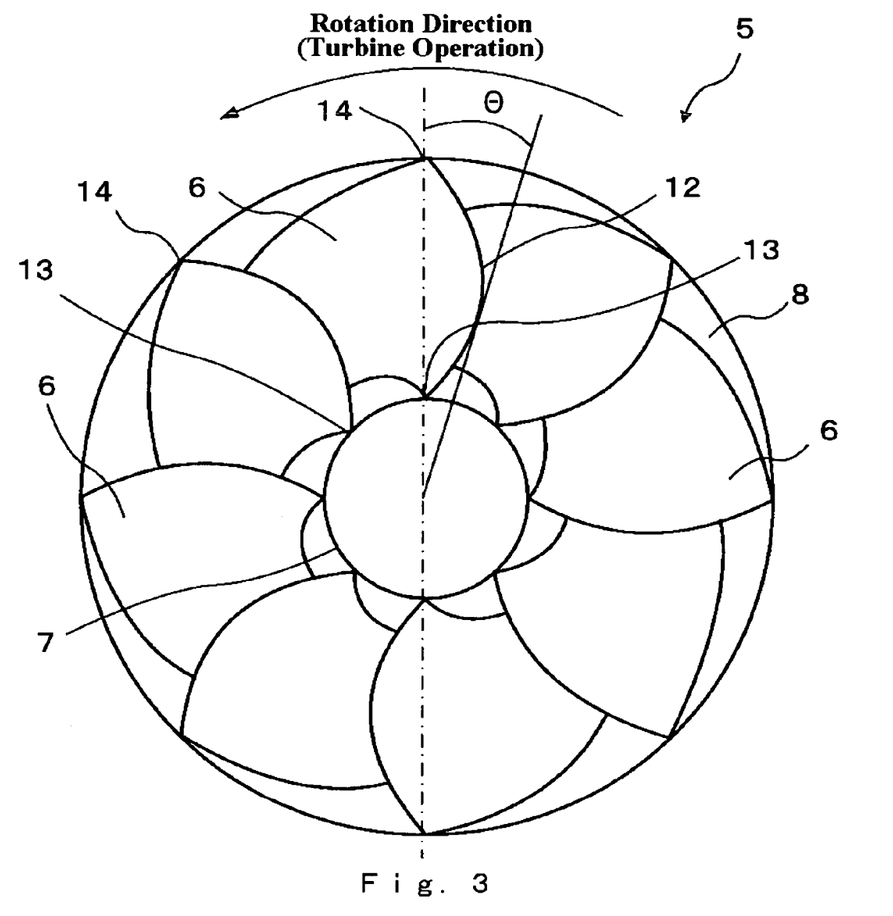
FIG. 3 is a plan view of a Francis turbine runner seen from the runner outlet side, according to the embodiment.

The projected profile of trailing edge 12, which is formed to be convex toward a direction opposite to the turbine direction, in the embodiment shown in FIG. 1 will be further explained below. FIG. 3 is a plan view of Francis turbine runner 5 seen from the runner outlet side, according to the embodiment. In FIG. 3, the same symbols are used to indicate corresponding features as in FIG. 1. Detailed descriptions may be omitted for the same component as referred to in FIG. 1.

Since FIG. 3 shows projected profiles of the outlet of Francis turbine runner 5 on the plane that is perpendicular to the rotation axis of Francis turbine runner 5, a polar coordinates system using parameters r and θ can be introduced such that:

(a) an origin is defined as at the center axis of the rotating shaft, which is corresponding to the center of crown 7, (b) a positive direction of θ, which means angle, is defined as the turbine direction.

Using this polar coordinate system, the projected profile of the trailing edge 12 on the perpendicular plane can be expressed as a function of r and θ, in which r means a distance from the center of crown 7. Since the positive direction of θ is set to the turbine direction, the function satisfies:

$$\frac{\partial^2 \theta}{\partial r^2} > 0.$$

Further, when a reference line of the angle θ, which means an origin of θ (θ equals zero), is defined as a straight line (radial straight line) connecting from the center of crown 7 to crown connecting point 13, the projected profile of trailing edge 12 satisfies:

$$\theta \leq 0$$

at crown 7 side.

In this embodiment, the projected profile of trailing edge 12 of blade 6 has a same angle θ, which equals zero, at each of an inner circumference edge (band connecting point 14) and an outer circumference edge (crown connecting point 13). This means that band connecting point 14 exists on the radial straight line, which connects between the center of crown 7 and crown connecting point 13. In this case, the projected profile of trailing edge 12 satisfies:

$$\theta \leq 0$$

from crown connecting point 13 to band connecting point 14.

Since the projected profile of the trailing edge is formed to be convex in the direction opposite to the turbine direction, a point that has the minimum value of θ on the projected profile of trailing edge 12 is a local minimum point, where the value of θ is locally minimized. In other words, the function of the projected profile satisfies:

$$\frac{\partial \theta}{\partial r} = 0$$

at the point where the value of θ is the smallest on the projected profile.

Figure 4:
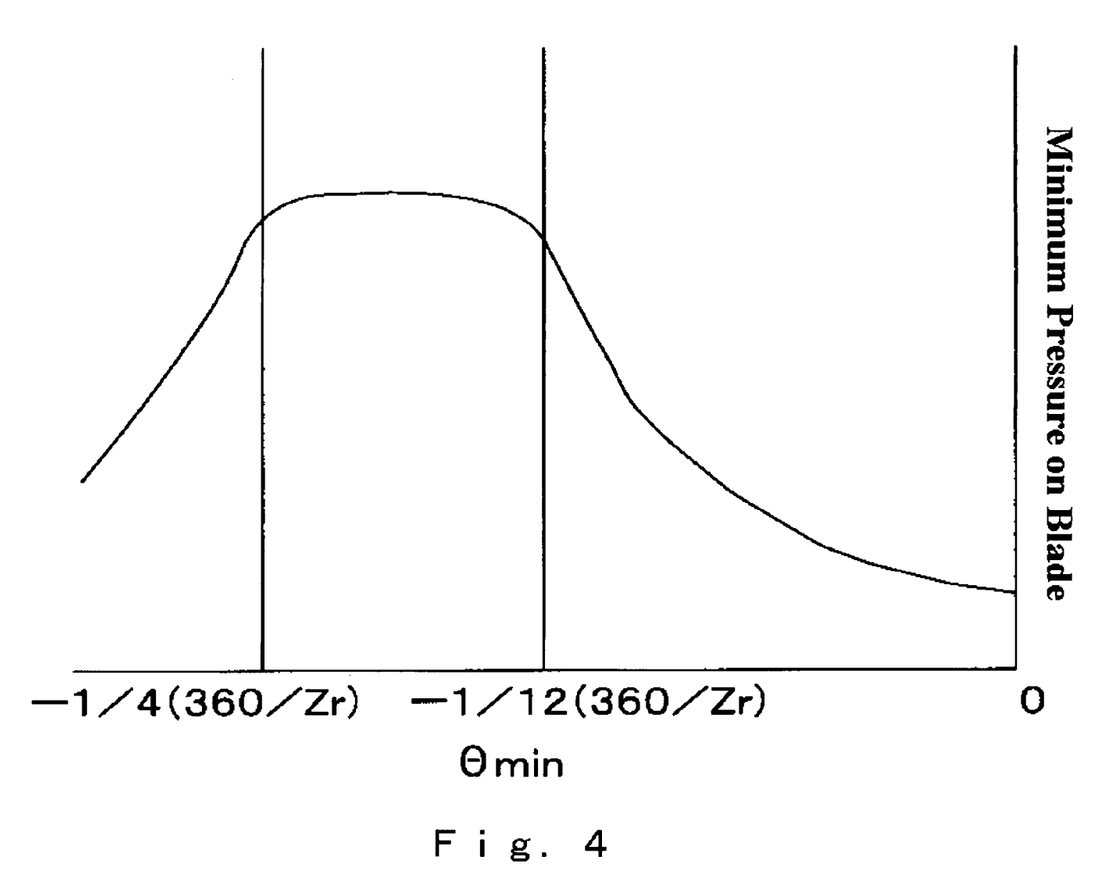
FIG. 4 is a characteristic diagram showing a relation between the minimum value of the pressure on the blade surface and a θ value at the local minimum point on the projected profile of the trailing edge.

FIG. 4 is a characteristic diagram showing a relation between the minimum value of the pressure on the blade surface and a θ value (referred to as θmin) at the local minimum point on the projected profile of trailing edge 12. In FIG. 4 symbol Zr indicates the number of blades 6 shown in FIGS. 1 and 3.

As shown in FIG. 4, as θmin increases in a negative direction, the minimum value of the pressure on the blade surface increases. Therefore, a minimum value of θ along the projected profile, which is corresponding to the value of θ at the local minimum point, is preferably in a range of:

$$-\frac{1}{4}\frac{360}{Zr} \le \theta_{min} \le -\frac{1}{12}\frac{360}{Zr} \text{ degrees.}$$

According to this, the minimum value of the pressure on the blade surface becomes large, therefore the pressure may become not less than the saturation vapor pressure, at which the cavitations are generated. In other words, the Francis turbine may be operated in an area where the cavitations are generated on the blade surface of the conventional Francis turbine.

A second embodiment in accordance with the invention will be explained referring to FIGS. 5 to 9.

Figure 5:
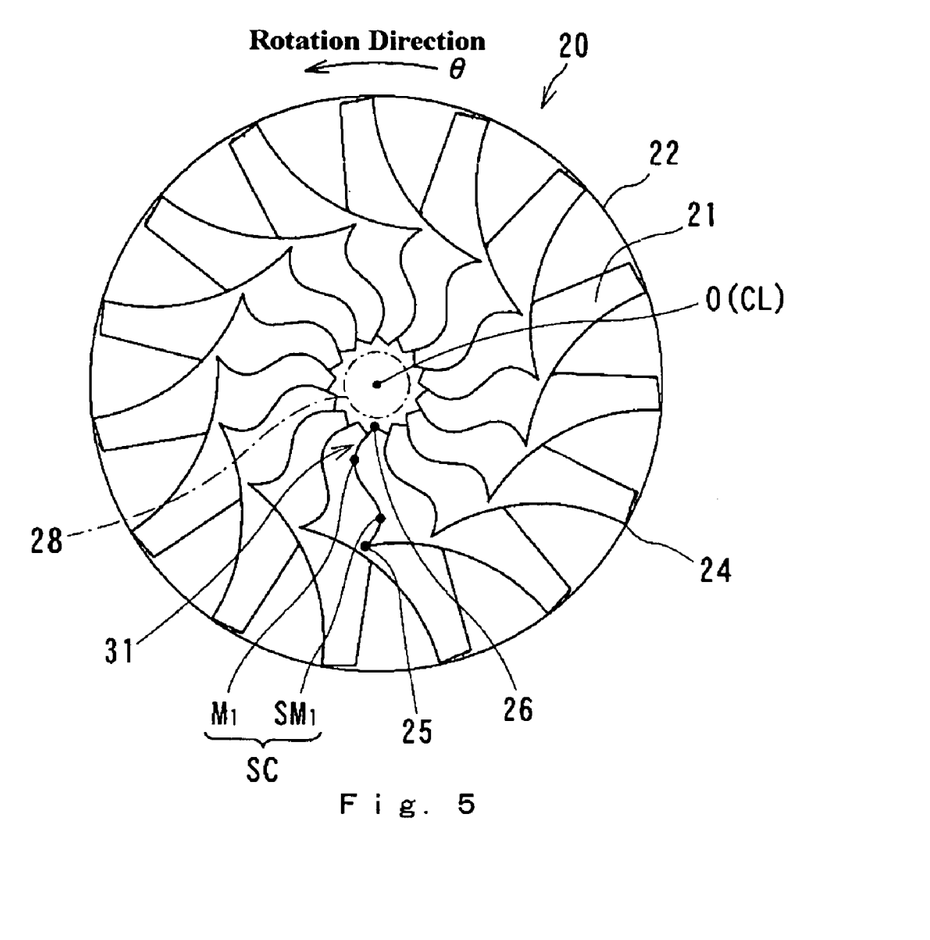
FIG. 5 is a plan view of the blades seen from an outlet side of the turbine with the band being removed from the runner.

FIG. 5 is a plan view of the blades seen from an outlet side of the turbine (band side) with the band being removed from the runner. In FIG. 5, a symbol 20 indicates a Francis turbine runner. A symbol 21 indicates a blade, a symbol 22 indicates a crown. Same as first embodiment, Francis turbine runner 20 includes crown 22, a plurality of blades 21 and a band (not shown). A symbol 24 indicates a leading edge, which is an outer end of blade 21, in which water comes during the turbine operation. A symbol 31 indicates a trailing edge, which is an inner end of blade 21, where water flows out during the turbine operation. A symbol 28 indicates a rotating shaft (spindle) connected to crown 22. A rotation center of rotating shaft 28 is referred to as ○ (also referred to as CL), which is corresponding to a rotation axis. Same as the first embodiment, FIG. 5 shows projected profiles of blades 21 of Francis turbine runner 20 on a plane that is perpendicular to the rotation axis of the Francis turbine runner 20. A symbol 25 indicates a band connecting point, where the band and trailing edge 31 are connected, while a symbol 26 indicates a crown connecting point, where crown 22 and trailing edge 31 are connected.

The projected profile of a trailing edge 31 of blade 21 on the plane perpendicular to the rotation axis CL of the spindle (rotation shaft) 28 is formed to be concave in shape in the turbine direction from crown connecting point 26 (inner circumference side), and is formed in a sigmoid curve pattern that is convex in the turbine direction toward band connecting point 25 (outer circumference side). In other words, a projected profile of the trailing edge 31 on the plane is curved toward a direction opposite to the turbine direction, and formed to be convex with respect to the direction opposite to the turbine direction at crown 22 side (near crown connecting point 26). And the projected profile is curved toward the turbine direction, and formed to be convex with respect to the turbine direction at the band side (near band connecting point 25). Band connecting point 25 exists on a radial straight line, which connects between rotation axis CL and crown connecting point 26. In other words, both ends of the projected profile of trailing edge 31 are located on the radial straight line.

In this embodiment, a polar coordinates system using parameters r and θ also can be introduced such that:

(a) an origin is defined as at the center axis CL of the rotating shaft 28, which is corresponding to rotation center ○, (b) a positive direction of θ, which means angle, is defined as the turbine direction.

The projected profile of trailing edge 31 of blade 21 is configured such that it satisfies:

$$\frac{\partial^2 \theta}{\partial r^2} > 0, \tag{1}$$

at crown connecting point 26, and satisfies:

$$\frac{\partial^2 \theta}{\partial r^2} < 0, \tag{2}$$

at band connecting point 25. The projected profile may preferably be formed to have values of θ that satisfies:

$$\frac{\partial \theta}{\partial r} = 0, \tag{3}$$

in each of the portions that satisfy formula (1) or (2). The points that satisfy equation (3) are a local minimum point $M_1$ and a local maximum point $SM_1$ shown in FIG. 5. In other words, local minimum point $M_1$ is the point on the projected profile that satisfies:

$$\frac{\partial^2 \theta}{\partial r^2} > 0 \text{ and } \frac{\partial \theta}{\partial r} = 0,$$

while local maximum point $SM_1$ is the point on the projected profile that satisfies:

$$\frac{\partial^2 \theta}{\partial r^2} < 0 \text{ and } \frac{\partial \theta}{\partial r} = 0.$$

Thus, trailing edge 31 is configured in the sigmoid curve SC as a whole.

Figure 6:
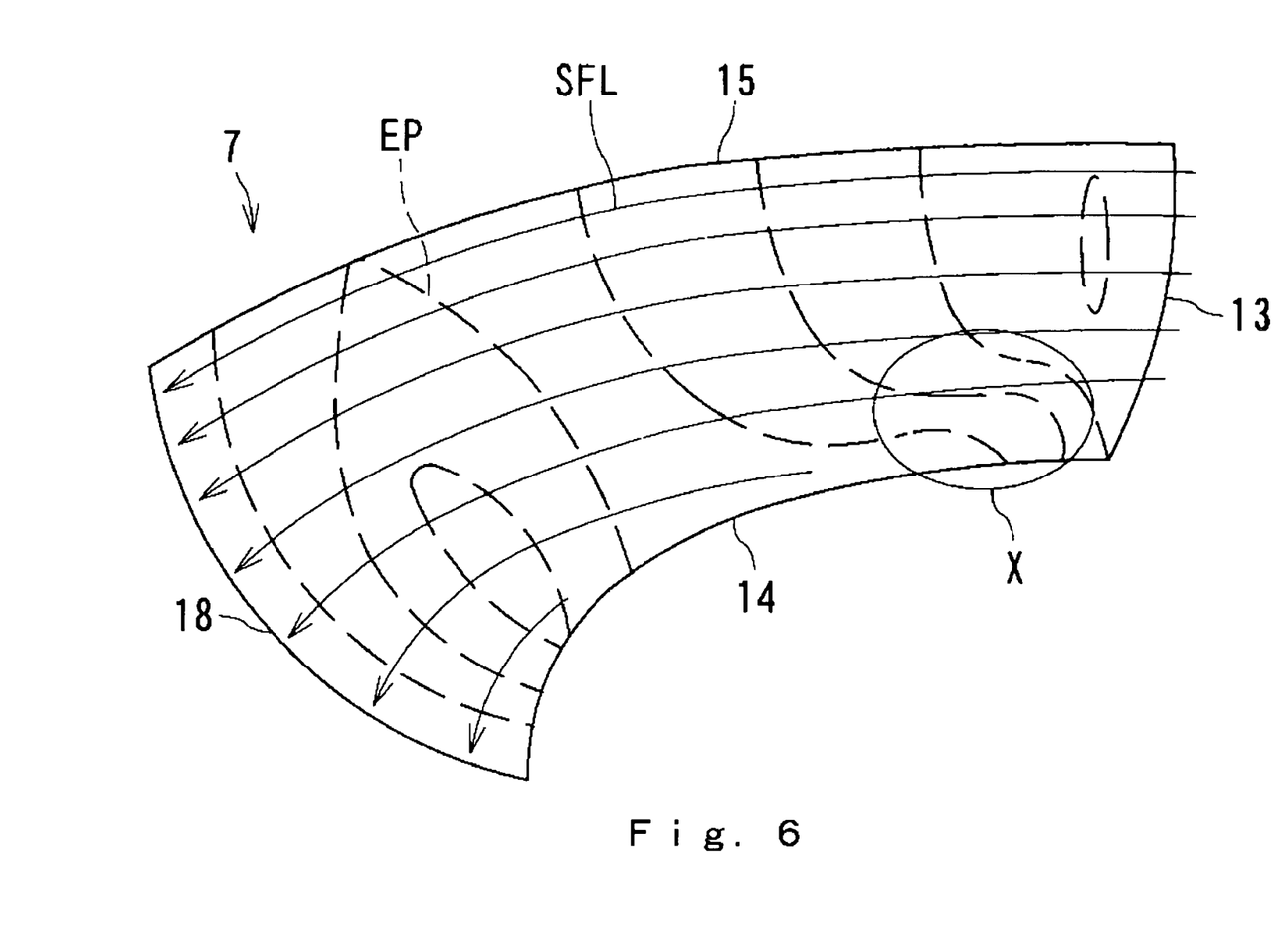
FIG. 6 is a schematic exploded view of the conventional blade for the Francis turbine runner, schematically showing a result of a simulation of a pressure distribution on the suction surface during the turbine operation.

FIG. 6 is a schematic exploded view of the conventional blade for the Francis turbine runner, schematically showing a result of a simulation of a pressure distribution on the suction surface during the turbine operation.

In FIG. 6, a symbol 7 is a blade, a symbol 18 is a trailing edge, a symbol 14 is a band (band side root), and a symbol 15 is a crown (crown side root). In FIG. 6, a symbol SFL indicates stream line (line of flow) and a symbol EP indicates a constant pressure line. In this conventional blade 7, a projected profile of trailing edge 18 on the plane perpendicular to the rotation axis is formed as a radial straight line from crown 15 to band 14.

As shown in FIG. 6, pressure distribution is distorted around "X" region, which means that a flow toward band side root 14 is generated in the "X" region. The flow toward band side root 14 around the "X" region is corresponding to secondary flow. The reason for pressure distortion around the "X" region may be due to a difference of pressure between the leading edge and trailing edge 18 along stream line SFL being inconsistent between the band 14 side and the crown 15 side. In other words, the pressure difference along stream line SFL of crown 15 side is larger than that of band 14 side.

In general, the pressure difference between the leading edge and the trailing edge can be enlarged by shortening the length of the blade. In the embodiment shown in FIG. 5, the length of the blade 21 is enlarged in crown 22 side and shortened in band 23 side compared to the radial straight line, which connects between rotation axis CL and crown connecting point 26. This may make the pressure difference between the leading edge and the trailing edge consistent between band 23 side and crown 22 side, and contribute to dissolve the pressure distortion, which is seen in "X" region of FIG. 6.

Figure 7:
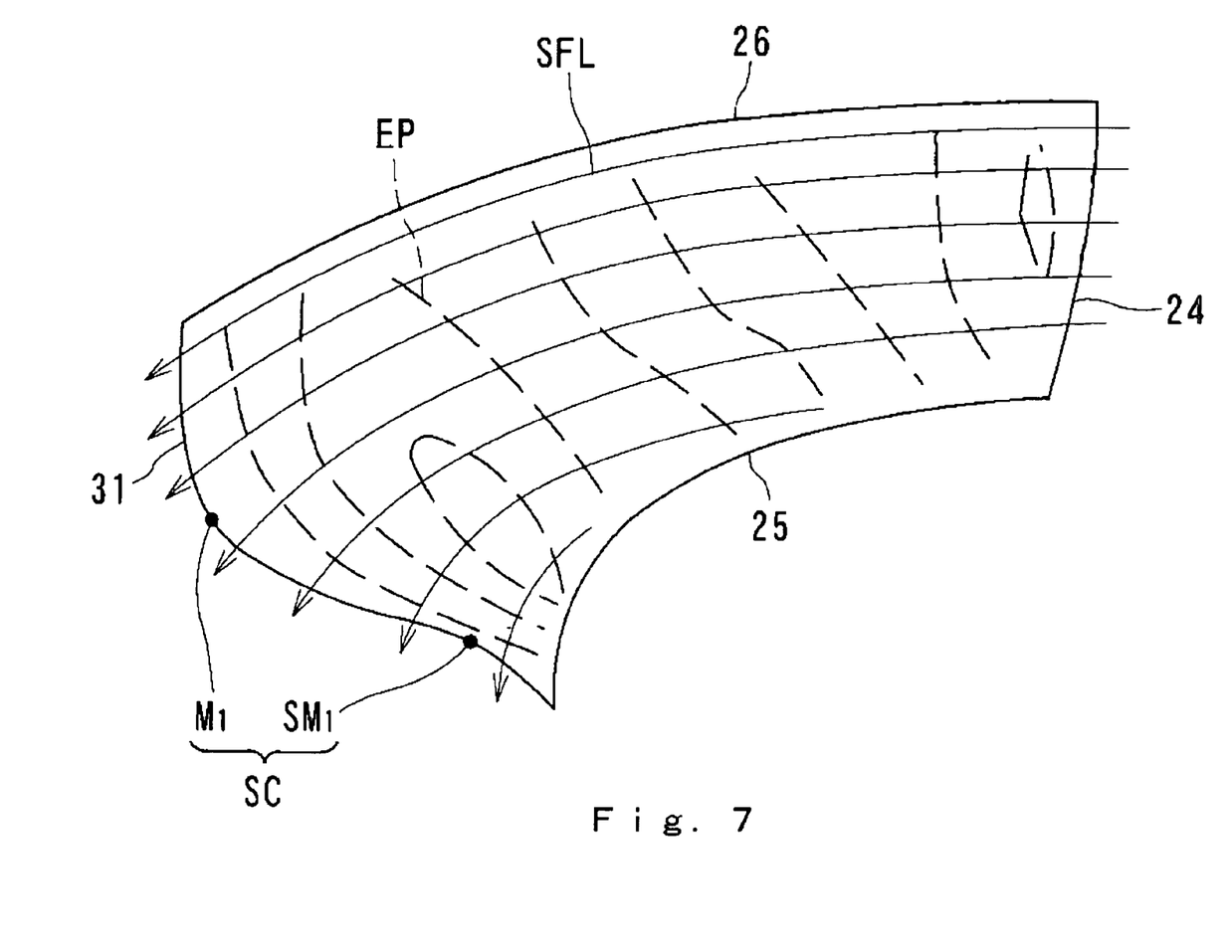
FIG. 7 is a schematic exploded view of the blade for the Francis turbine runner according to this embodiment, schematically showing a result of a simulation of a pressure distribution on the suction surface during the turbine operation.

FIG. 7 is a schematic exploded view of the blade for the Francis turbine runner according to this embodiment, schematically showing a result of a simulation of a pressure distribution on the suction surface during the turbine operation. In FIG. 7, the same symbols are used to indicate corresponding features as in FIG. 5. A symbol SFL indicates stream line (line of flow) and a symbol EP indicates a constant pressure line. Trailing edge 31 of the runner blade 21 is configured in the sigmoid curve SC as a whole.

As shown in FIG. 7, the pressure distortion found near leading edge 13 of the band side root 14 in FIG. 6 is not found. This means a flow in a direction different from stream line SFL is hardly generated, resulting in reduction of the secondary flow. Reduction of the secondary flow on the suction surface may improve hydraulic efficiency of the Francis turbine runner. Especially, since there is no pressure distortion at the suction side surface, the turbine efficiency in partial load operation of the Francis turbine may be improved.

Figure 8:
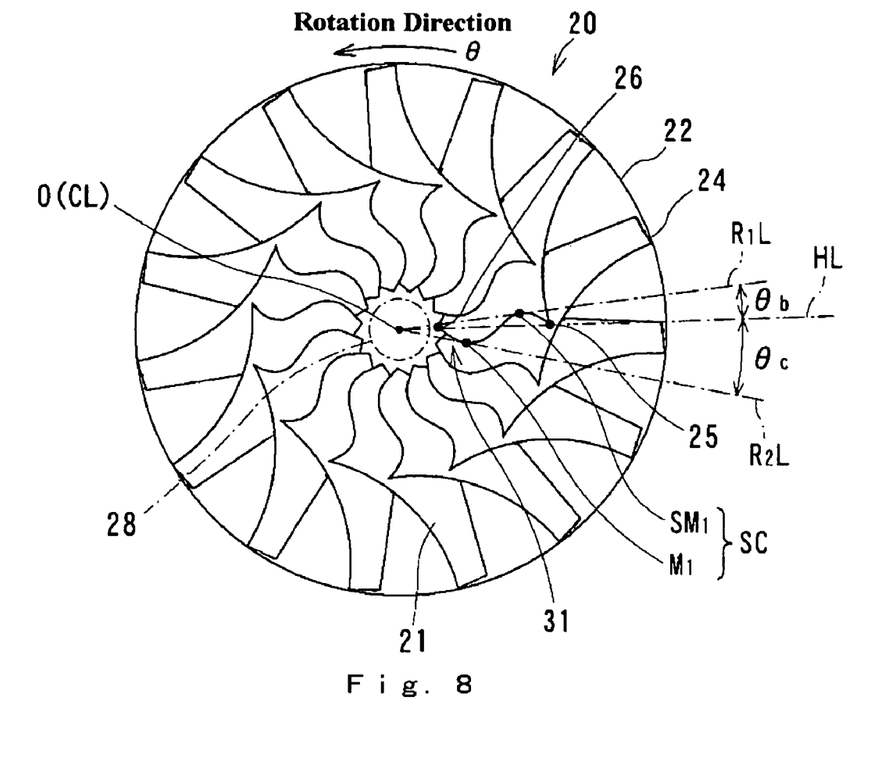
FIG. 8 is a plan view of the blades seen from an outlet side of the turbine with the band being removed from the runner.

Furthermore, positions of the local minimum point $M_1$ and the local maximum point $SM_1$ will be described using FIG. 8. FIG. 8 is a plan view of the runner blade seen from the outlet side of the turbine (band side) with the band being removed as in FIG. 5., The same components as in FIG. 5 are marked with the same symbols and are not be described in detail.

FIG. 8 corresponds to the projected drawing in which trailing edge 31 of blade 21 is projected on the plane perpendicular to the rotation center CL of the spindle (rotation axis) 28. The polar coordinates system using parameters r and θ also can be introduced. At that time, the value of θ at crown connecting point 26 is defined as zero, the value of θ at local minimum point $M_1$ and local maximum point $SM_1$ are defined as $\theta_c$ and $\theta_b$ respectively. In the projected profile of trailing edge 31 of blade 21, the circumferential position of crown connecting point 26 equals to that of band connecting point 25. In other words, θ of the band connecting point 25 and θ of crown connecting point 26 is the same, which equals zero in this case. $\theta_b$ corresponds to an angle between line HL and a line $R_1L$, which connects between rotation center CL and local maximum point $SM_1$.

$\theta_c$ corresponds to an angle between line HL and a line $R_2L$, which connects between rotation center CL and local minimum point $M_1$.

Figure 9:
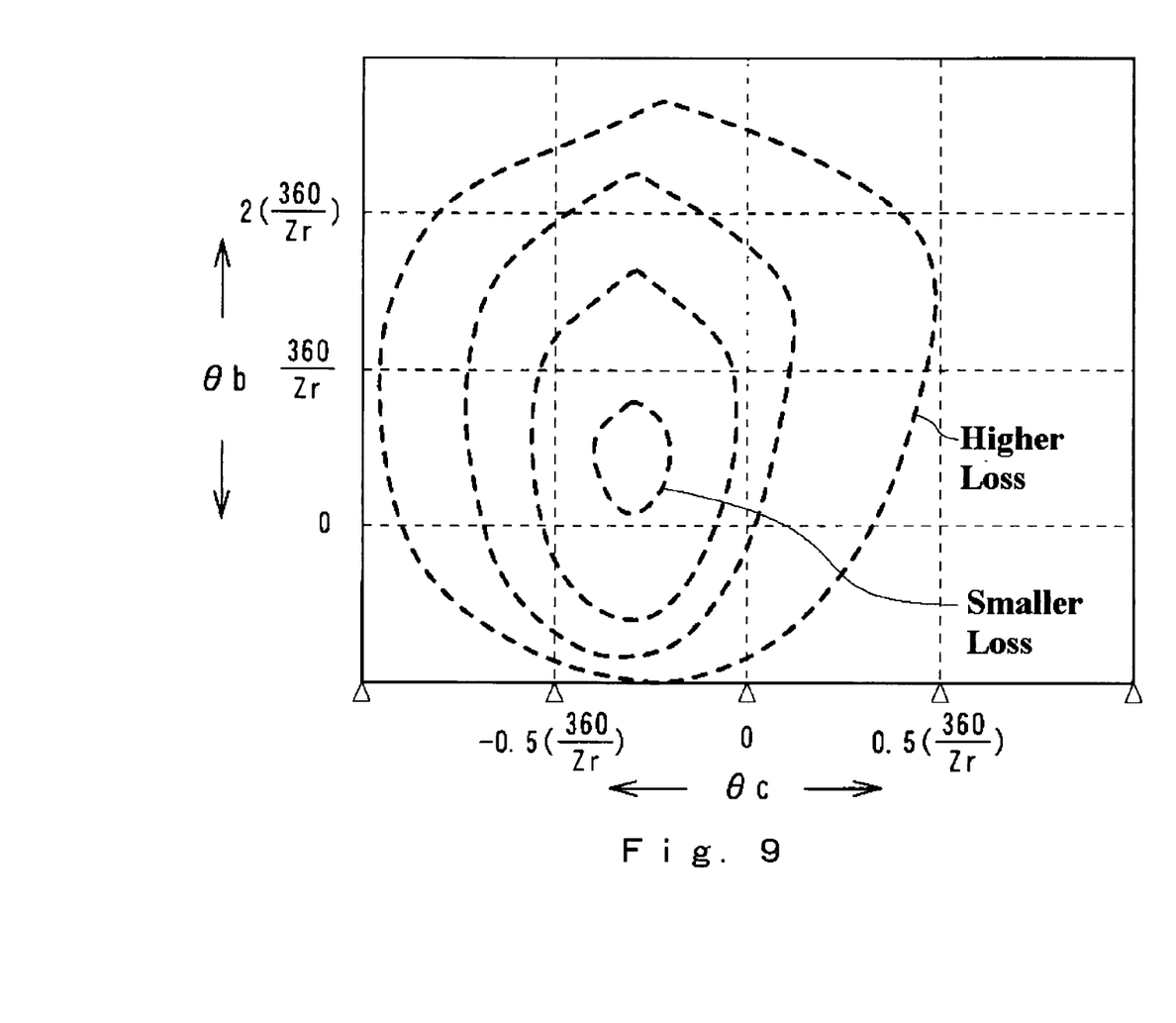
FIG. 9 is a characteristic diagram showing a relation among $\theta_b$, $\theta_c$, and hydraulic loss.

FIG. 9 is a characteristic diagram showing a relation among $\theta_b$, $\theta_c$, and hydraulic loss. Hydraulic loss is illustrated as curves connecting points of equal loss in the various values of $\theta_c$ and $\theta_b$. The vertical axis is the value of $\theta_b$, while the horizontal axis is the value of $\theta_c$. A positive direction of θ ($\theta_c$ and $\theta_b$) is the turbine direction. In FIG. 9, Zr is the number of blades 21 of runner 20, and the dotted lines are constant loss curves, which show that the hydraulic loss is smaller at a more inner side than the periphery. As shown in FIG. 9, values of $\theta_c$ and $\theta_b$ may be preferably, $$-\frac{1}{2}\frac{360}{Zr} \leq \theta_c \leq 0 \text{ degrees,}$$

and $$0 \leq \theta_b \leq \frac{360}{Zr} \text{ degrees.}$$

In other words, since local minimum point $M_1$ and local maximum point $SM_1$ are points that satisfy the formula (1), (2), and the equation (3) mentioned above, the projected profile of the trailing edge 31 has two points which preferably satisfies:

$$\frac{\partial \theta}{\partial r} = 0, \frac{\partial^2 \theta}{\partial r^2} > 0 \text{ and } -\frac{1}{2}\frac{360}{Zr} \leq \theta \leq 0 \text{ degrees,}$$

or, $$\frac{\partial \theta}{\partial r} = 0, \frac{\partial^2 \theta}{\partial r^2} < 0 \text{ and } 0 \leq \theta \leq \frac{360}{Zr} \text{ degrees.}$$

Other embodiments of the present invention will be apparent to those skilled in the art from consideration of the specification and practice of the invention disclosed herein. And a profile of an leading edge, which is described in an application entitled "Francis turbine" filed on the same day of this application under attorney docket number 016910/0510, may be applied to the above mentioned embodiment for further improvement of performance.

What is claimed is:

1. A Francis turbine, comprising:
   a rotating shaft;
   a crown, which can rotate with the rotating shaft;
   a plurality of blades circumferentially arranged on the crown, each of which including an inner end as a trailing edge; and
   a band coaxially coupled with the crown by the blades;
   wherein the rotating shaft, the crown, the blades, and the band as a whole are driven by water and rotate toward a turbine direction during a turbine operation,
   wherein a projected profile of the trailing edge on a perpendicular plane, which is perpendicular to a center axis of the rotating shaft, is curved toward a direction opposite to the turbine direction at least in the crown side, and
   wherein the projected profile of the trailing edge on the perpendicular plane is curved toward the turbine direction in the band side.

2. A Francis turbine, comprising:
   a rotating shaft;
   a crown, which can rotate with the rotating shaft;
   a plurality of blades circumferentially arranged on the crown, each of which including an inner end as a trailing edge; and
   a band coaxially coupled with the crown by the blades;

wherein the rotating shaft, the crown, the blades, and the band as a whole are driven by water and rotate toward a turbine direction during a turbine operation, wherein a projected profile of the trailing edge on a perpendicular plane, which is perpendicular to a center axis of the rotating shaft, is curved toward a direction opposite to the turbine direction at least in the crown side, and wherein both ends of the projected profile of the trailing edge and a point of the center axis of the rotating shaft on the perpendicular plane are arranged in a straight line.

3. A Francis turbine according to claim 2, wherein the projected profile of the trailing edge can be expressed in a polar coordinate system defined by parameters r and θ introduced in the perpendicular plane such that,
  (a) an origin is set at the center axis of the rotating shaft,
  (b) an origin of θ is set at a crown connecting point, where the trailing edge and the crown are connected,
  (c) a positive direction of θ is set to the turbine direction, wherein a number of the blades is Zr, wherein a minimum value of θ along the projected profile is in a range of $$(d) \quad -\frac{1}{4}\frac{360}{Zr} \leq \theta \leq -\frac{1}{12}\frac{360}{Zr} \text{ degrees}.$$

4. A Francis turbine, comprising:
a rotating shaft;
a crown, which can rotate with the rotating shaft;
a plurality of blades circumferentially arranged on the crown, each of which including an inner end as a trailing edge; and
a band coaxially coupled with the crown by the blades;
wherein the rotating shaft, the crown, the blades, and the band as a whole are driven by water and rotate toward a turbine direction during a turbine operation,
wherein a projected profile of the trailing edge on a perpendicular plane, which is perpendicular to a center axis of the rotating shaft, is curved toward a direction opposite to the turbine direction at least in the crown side, and
wherein the projected profile of the trailing edge can be expressed in a polar coordinate system defined by parameters r and θ introduced in the perpendicular plane such that,
  (a) an origin is set at the center axis of the rotating shaft,
  (b) an origin of θ is set at a crown connecting point, where the trailing edge and the crown are connected,
  (c) a positive direction of θ is set to the turbine direction,
wherein a number of the blades is Zr,
wherein a minimum value of θ along the projected profile is in a range of $$(d) \quad -\frac{1}{4}\frac{360}{Zr} \leq \theta \leq -\frac{1}{12}\frac{360}{Zr} \text{ degrees}.$$

5. A Francis turbine according to claim 4, wherein the projected profile of the trailing edge can be expressed in a polar coordinate system defined by parameters r and θ introduced in the perpendicular plane such that,
  (a) an origin is set at the center axis of the rotating shaft,
  (b) an origin of θ is set at a crown connecting point, where the trailing edge and the crown are connected,
  (c) a positive direction of θ is set to the turbine direction, wherein the projected profile of the trailing edge on the perpendicular plane has a local minimum point and a local maximum point for θ with regard to r, wherein a number of the blades is Zr, wherein a value of θ at the local minimum point is set as $$(d) \quad -\frac{1}{2}\frac{360}{Zr} \leq \theta \leq 0 \text{ degrees},$$

wherein a value of θ at the local maximum point is set as $$(e) \quad 0 \leq \theta \leq \frac{360}{Zr} \text{ degrees}.$$

6. A Francis turbine runner that is rotatable around a rotation axis, comprising:
a crown, which can rotate around the rotation axis;
a plurality of blades circumferentially arranged on the crown, each of which including an inner end as a trailing edge; and
a band coaxially coupled with the crown by the blades;
wherein the crown, the blades, and the band as a whole are driven by water and rotate toward a turbine direction during a turbine operation,
wherein a polar coordinate system defined by parameters r and θ can be introduced on a perpendicular plane, which is perpendicular to the rotation axis, such that,
  (a) an origin is set at the rotation axis,
  (b) a positive direction of θ is set to the turbine direction,
wherein a projected profile of the trailing edge on the perpendicular plane is expressed in the polar coordinate system as $$(c) \quad \frac{\partial^2 \theta}{\partial r^2} > 0$$

at least in the crown side,
wherein a value of θ satisfies;
  (d) θ<0
at least in the crown side when an origin of θ is set to a crown connecting point, where the trailing edge and the crown are connected.

7. A Francis turbine runner according to claim 6, wherein values of θ at both ends of the projected profile of the trailing edge are substantially the same.

8. A Francis turbine runner according to claim 7, wherein a number of the blades is Zr, wherein the projected profile of the trailing edge has a local minimum point which satisfies, (e) $\frac{\partial \theta}{\partial r} = 0$, wherein a value of θ at the local minimum point is in a range of (f) $-\frac{1}{4}\frac{360}{Zr} \leq \theta \leq -\frac{1}{12}\frac{360}{Zr}$ degrees when an origin of θ is set to a crown connecting point, where the trailing edge and the crown are connected.

9. A Francis turbine runner according to claim 6, wherein a number of the blades is Zr, wherein the projected profile of the trailing edge has a local minimum point which satisfies, (e) $\frac{\partial \theta}{\partial r} = 0$, wherein a value of θ at the local minimum point is in a range of (f) $-\frac{1}{4}\frac{360}{Zr} \leq \theta \leq -\frac{1}{12}\frac{360}{Zr}$ degrees when an origin of θ is set to a crown connecting point, where the trailing edge and the crown are connected.

10. A Francis turbine runner according to claim 6, wherein the projected profile of the trailing edge is expressed in the polar coordinate system as (e) $\frac{\partial^2 \theta}{\partial r^2} < 0$ in the band side.

11. A Francis turbine runner according to claim 10, wherein a number of the blades is Zr, wherein the projected profile of the trailing edge has a first and a second points which satisfy, (f) $\frac{\partial \theta}{\partial r} = 0$, wherein the first point satisfies, (g) $\frac{\partial^2 \theta}{\partial r^2} > 0$ and $-\frac{1}{2}\frac{360}{Zr} \leq \theta \leq 0$ degrees when an origin of θ is set to a crown connecting point, where the trailing edge and the crown are connected, wherein the second point satisfies, (h) $\frac{\partial^2 \theta}{\partial r^2} < 0$ and $0 \leq \theta \leq \frac{360}{Zr}$ degrees when an origin of θ is set to the crown connecting point.

12. A Francis turbine, comprising:

a rotating shaft;

a crown, which can rotate with the rotating shaft;

a plurality of blades circumferentially arranged on the crown, each of which including an inner end as a trailing edge; and a band coaxially coupled with the crown by the blades;

wherein the rotating shaft, the crown, the blades, and the band as a whole are driven by water and rotate toward a turbine direction during a turbine operation, wherein a projected profile of the trailing edge on a perpendicular plane, which is perpendicular to a center axis of the rotating shaft, is curved toward a direction opposite to the turbine direction at least in the crown side, and wherein the projected profile of the trailing edge on the perpendicular plane is, at least in the crown side, located in a region that is opposite to the turbine direction against a straight line that connects a center of the rotating shaft and a crown connecting point, where the trailing edge and the crown are connected.

13. A Francis turbine according to claim 12, wherein both ends of the projected profile of the trailing edge and a point of the center axis of the rotating shaft on the perpendicular plane are arranged in a straight line.

14. A Francis turbine according to claim 13, wherein the projected profile of the trailing edge can be expressed in a polar coordinate system defined by parameters r and θ introduced in the perpendicular plane such that, (a) an origin is set at the center axis of the rotating shaft, (b) an origin of θ is set at a crown connecting point, where the trailing edge and the crown are connected, (c) a positive direction of θ is set to the turbine direction, wherein a number of the blades is Zr, wherein a minimum value of θ along the projected profile is in a range of (d) $-\frac{1}{4}\frac{360}{Zr} \leq \theta \leq -\frac{1}{12}\frac{360}{Zr}$ degrees.

15. A Francis turbine according to claim 12, wherein the projected profile of the trailing edge can be expressed in a polar coordinate system defined by parameters r and θ introduced in the perpendicular plane such that, (a) an origin is set at the center axis of the rotating shaft, (b) an origin of θ is set at a crown connecting point, where the trailing edge and the crown are connected, (c) a positive direction of θ is set to the turbine direction, wherein a number of the blades is Zr, wherein a minimum value of θ along the projected profile is in a range of (d) $-\frac{1}{4}\frac{360}{Zr} \leq \theta \leq -\frac{1}{12}\frac{360}{Zr}$ degrees.

16. A Francis turbine according to claim 12, wherein the projected profile of the trailing edge on the perpendicular plane is curved toward the turbine direction in the band side.

17. A Francis turbine according to claim 16,
wherein the projected profile of the trailing edge can be expressed in a polar coordinate system defined by parameters r and θ introduced in the perpendicular plane such that,
(a) an origin is set at the center axis of the rotating shaft,
(b) an origin of θ is set at a crown connecting point, where the trailing edge and the crown are connected,
(c) a positive direction of θ is set to the turbine direction,
wherein the projected profile of the trailing edge on the perpendicular plane has a local minimum point and a local maximum point for θ with regard to r,
wherein a number of the blades is Zr,
wherein a value of θ at the local minimum point is set as (d) $-\dfrac{1}{2}\dfrac{360}{Zr} \leq \theta \leq 0$ degrees, wherein a value of θ at the local maximum point is set as (e) $0 \leq \theta \leq \dfrac{360}{Zr}$ degrees.

* * * * *